US011861582B2

(12) United States Patent
Nagaraja et al.

(10) Patent No.: US 11,861,582 B2
(45) Date of Patent: Jan. 2, 2024

(54) SECURITY PROTECTION OF ASSOCIATION BETWEEN A USER DEVICE AND A USER

(71) Applicant: Visa International Service Association, San Francisco, CA (US)

(72) Inventors: Vinjith Nagaraja, Austin, TX (US); Dhaval Gangar, Milpitas, CA (US)

(73) Assignee: Visa International Service Association, San Francisco, CA (US)

( * ) Notice: Subject to any disclaimer, the term of this patent is extended or adjusted under 35 U.S.C. 154(b) by 107 days.

(21) Appl. No.: 17/116,257

(22) Filed: Dec. 9, 2020

(65) Prior Publication Data
US 2021/0209574 A1 Jul. 8, 2021

Related U.S. Application Data

(60) Provisional application No. 62/956,432, filed on Jan. 2, 2020.

(51) Int. Cl.
G06Q 20/20 (2012.01)
H04L 9/40 (2022.01)
G06Q 20/40 (2012.01)

(52) U.S. Cl.
CPC ......... *G06Q 20/206* (2013.01); *G06Q 20/401* (2013.01); *H04L 63/0838* (2013.01); *H04L 63/0876* (2013.01)

(58) Field of Classification Search
None
See application file for complete search history.

(56) References Cited

U.S. PATENT DOCUMENTS 8,875,255 B1 * 10/2014 Dotan ............... H04L 63/08
713/182
9,160,830 B2 10/2015 Jain
(Continued)

FOREIGN PATENT DOCUMENTS

GB 2517276 A 2/2015
KR 10-2016-0055130 5/2016
(Continued)

OTHER PUBLICATIONS

Krebs, "Busting SIM Swappers and SIM Swap Myths," Krebs on Security (2018); downloaded from the Internet at <https://krebsonsecurity.com/2018/11/busting-sim-swappers-and-sim-swap-myths>; 18 pages.

(Continued)

*Primary Examiner* — Fateh M Obaid
(74) *Attorney, Agent, or Firm* — Schwabe, Williamson & Wyatt, PC

(57) ABSTRACT

Embodiments include apparatuses, methods, and systems for performing security protection of association between a user device and a user. A computing system receives from a service provider a notification that an identifier of a user device has been activated in the user device to be associated with a user identifier to replace an existing identifier of the user device associated with the user identifier. The computing system further receives from the user device a request for information associated with the user identifier to be sent to the user device associated with the identifier of the user device. Before sending the requested information to the user device, the computing system verifies the identifier of the user device has been activated by the user by an additional authentication of the user through a communication path between the user and the computing system. Other embodiments may also be described and claimed.

19 Claims, 3 Drawing Sheets

(56) References Cited

U.S. PATENT DOCUMENTS

| | | |
|---|---|---|
| 9,384,479 B2 | 7/2016 | Larkin |
| 9,572,014 B2 | 2/2017 | Hauck |
| 2012/0003957 A1 | 1/2012 | Agevik |
| 2012/0221955 A1* | 8/2012 | Raleigh ................. H04M 15/00 726/1 |
| 2013/0132854 A1* | 5/2013 | Raleigh ................. G06F 3/0482 715/738 |
| 2015/0038120 A1 | 2/2015 | Larkin |
| 2015/0143456 A1* | 5/2015 | Raleigh .................. H04L 63/20 726/1 |
| 2017/0201850 A1* | 7/2017 | Raleigh .................. H04W 4/50 |
| 2017/0331819 A1 | 11/2017 | Quirke |
| 2020/0045519 A1* | 2/2020 | Raleigh ............... H04M 15/765 |

FOREIGN PATENT DOCUMENTS

| | | |
|---|---|---|
| WO | 2015193629 A1 | 12/2015 |
| WO | 2016050990 A1 | 4/2016 |

OTHER PUBLICATIONS

Wikipedia: SIM Swap Scam (2018); downloaded from the Internet at <https://en.wikipedia.org/wiki/SIM_swap_scam>; 3 pages.
Cimpanu, "Wave of SIM Swapping Attacks Hits US Cryptocurrency Users" (Jun. 3, 2019); downloaded from the Internet at <https://www.zdnet.com/article/wave-of-sim-swapping-attacks-hit-US-cryptocurrency-users/>; 9 pages.
International Search Report and Written Opinion for PCT/US2021/012066 dated Apr. 23, 2021; 10 pages.

* cited by examiner

SECURITY PROTECTION OF ASSOCIATION BETWEEN A USER DEVICE AND A USER

CROSS-REFERENCE TO RELATED APPLICATION

This application claims priority to U.S. Provisional Application No. 62/956,432, filed Jan. 2, 2020, the entire disclosure of which is incorporated herein by reference.

BACKGROUND

A network, e.g., a computer, communications, or data network, includes a collection of components, e.g., terminal nodes or computing devices, computing systems, switches, routers, connected by links to enable communication between the terminals, computing devices or systems. Networks are used extensively throughout the world to connect individuals and organizations to make ecommerce possible. A user may use a computing device, e.g., a user device, to communicate with another user device or a computing system of an organization through a communication network operated by various service providers. A service provider may identify a user by a user identifier, identify a user device by an identifier of a user device, and may further associate a user identifier with an identifier of a user device. Communications security is the discipline of preventing unauthorized interceptors from accessing a computer system or a communication network, while still delivering content to the intended recipients or users. With the wide spread use of Internet, ecommerce, and other applications, network or communication security is facing more and more challenges. For example, attackers may attempt to use a user device to perform account take over (ATO) of a user and may result in millions in fraud and losses for the user.

BRIEF SUMMARY

Embodiments disclosed herein include a computer-implemented method for communication to perform security protection of association between a user device and a user. The method includes receiving, by a processor of a computing system, from a service provider a notification that an identifier of a user device has been activated in the user device to be associated with a user identifier to replace an existing identifier of the user device associated with the user identifier. The notification may be received through a first communication path between the service provider and the computing system. The identifier of the user device is a hardware based network identifier of the user device, while the user identifier is to identify a user by the service provider. The method further includes storing, in a storage device coupled to the processor, the user identifier of the user to indicate that the existing identifier of the user device associated with the user identifier has been changed. Moreover, the method includes receiving, by the processor, from the user device a request for information associated with the user identifier to be sent to the user device associated with the identifier of the user device. The request for information associated with the user identifier is received through a second communication path between the user device and the computing system. The method further includes searching the storage device to look up the user identifier, and when the user identifier is found in the storage device, verifying the identifier of the user device has been activated by the user by an additional authentication of the user. The verifying the identifier of the user device has been activated by the user may be through a third communication path between the user and the computing system.

Embodiments disclosed herein include a computing system including one or more processors, a storage device coupled to the one or more processors, an application software to be operated by the one or more processors, and an authentication module to be operated by the one or more processors. The one or more processors are configured to receive from a service provider a notification that an identifier of a user device has been activated in the user device to be associated with a user identifier to replace an existing identifier of the user device associated with the user identifier. The notification is received through a first communication path between the service provider and the computing system. The identifier of the user device is a hardware based network identifier of the user device, and the user identifier is to identify a user by the service provider. The storage device is configured to store the user identifier of the user to indicate that the existing identifier of the user device associated with the user identifier has been changed. The application software is to receive from the user device a request for information associated with the user identifier to be sent to the user device associated with the identifier of the user device. The request is received through a second communication path between the user device and the computing system, and the information associated with the user identifier is for operating the application software by the user. The authentication module is to search the storage device to look up the user identifier, and when the user identifier is found in the storage device, send to the user a request for authentication information different from the user identifier of the user. The request for authentication information is sent through a third communication path between the user and the computing system. In addition, the authentication module is to receive from the user a response message to the request for authentication information, and authenticate the user based on the response message and a set of rules.

Embodiments disclosed herein include an executable software product stored on a non-transitory computer-readable medium containing program instructions that cause a processor of a computing system to perform various operations. For example, in response to execution of the instructions by the processor, the computing system is to receive a notification that an identifier of a user device has been activated in the user device to be associated with a user identifier to replace an existing identifier of the user device associated with the user identifier. The notification is received from a service provider through a first communication path between the service provider and the computing system. This notification takes place when a sim swap occurs, which may be well before the login attempt. The identifier of the user device is a hardware based network identifier of the user device, and the user identifier is to identify a user by the service provider. In response to execution of the instructions by the processor, the computing system is further to store, in a storage device coupled to the processor, the user identifier of the user to indicate that the existing identifier of the user device associated with the user identifier has been changed. Moreover, in response to execution of the instructions by the processor, the computing system is to receive, by the processor, a request for information associated with the user identifier to be sent to the user device associated with the identifier of the user device. The request for information is received from the user device through a second communication path between the user device and the computing system. In addition, in response to execution of the instructions by the processor, the computing system is to search the storage device to look up the user identifier, and send to the user, when the user identifier is found in the storage device, a request for authentication information different from the user identifier of the user. The request for authentication information is sent through a third communication path between the user and the computing system. Moreover, in response to execution of the instructions by the processor, the computing system is to receive from the user a response message to the request for authentication information, and authenticate the user based on the response message and a set of rules.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
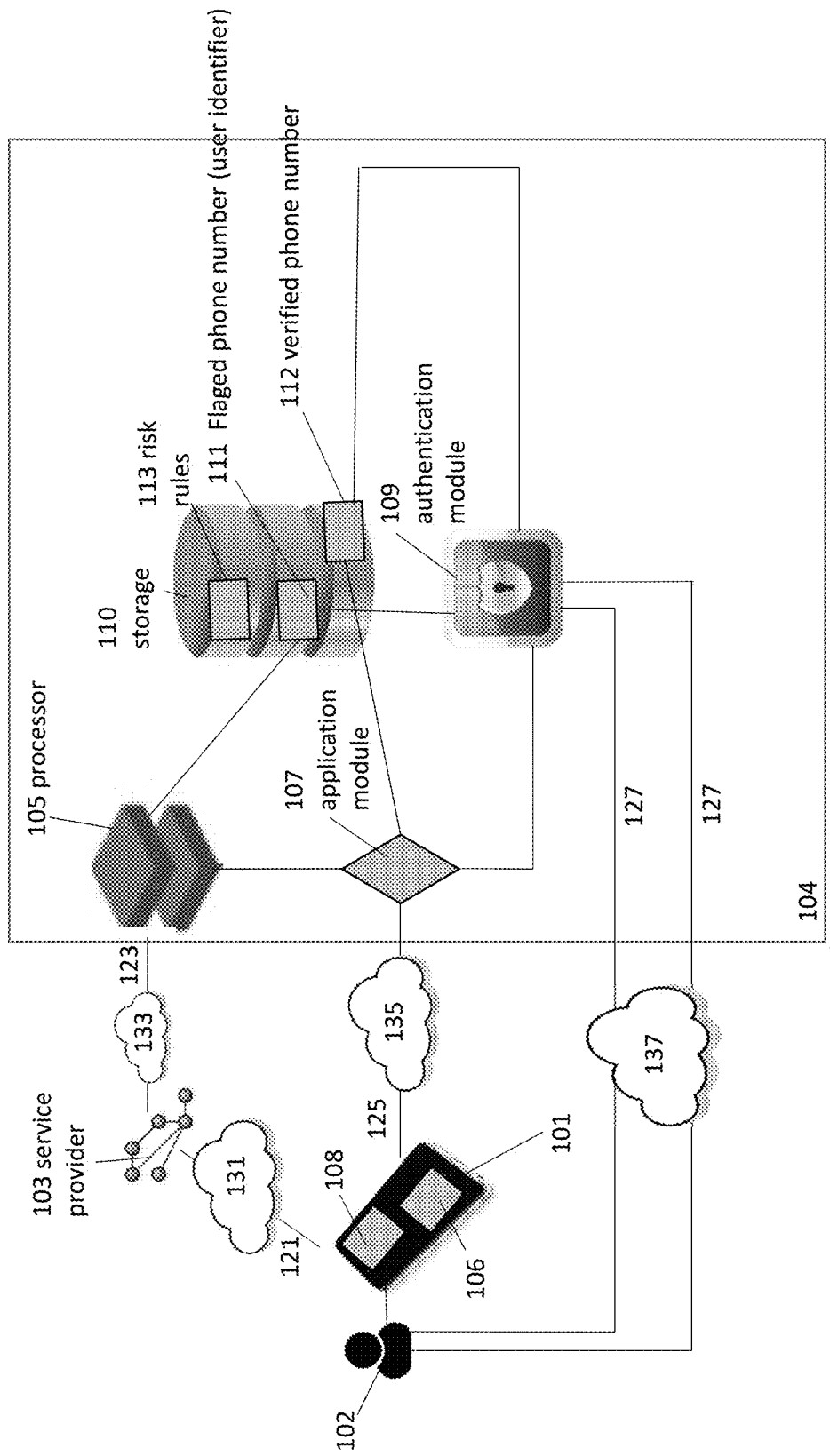
FIG. 1 illustrates a computing system to verify an identifier of a user device has been activated by a user to replace an existing identifier of the user device associated with a user identifier, in accordance with various embodiments.

The following description is presented to enable one of ordinary skill in the art to make and use the embodiments and is provided in the context of a patent application and its requirements. Various modifications to the exemplary embodiments and the generic principles and features described herein will be readily apparent. The exemplary embodiments are mainly described in terms of particular methods and systems provided in particular implementations. However, the methods and systems will operate effectively in other implementations. Phrases such as "exemplary embodiment", "one embodiment" and "another embodiment" may refer to the same or different embodiments. The embodiments will be described with respect to systems and/or devices having certain components. However, the systems and/or devices may include more or less components than those shown, and variations in the arrangement and type of the components may be made without departing from the scope of the current disclosure. Various embodiments will also be described in the context of particular methods having certain steps. However, the method and system operate effectively for other methods having different and/or additional steps and steps in different orders that are not inconsistent with the presented embodiments. Thus, the current disclosure is not intended to be limited to the embodiments shown, but is to be accorded the widest scope consistent with the principles and features described herein.

A user may use a computing device, e.g., a user device, to communicate with another user device or a computing system of an organization through a communication network operated by various service providers. A service provider or a network operator may identify a user by a user identifier such as a phone number or an email address, and identify a user device by a hardware based network identifier such as a subscriber identity module (SIM) card, or a media access control (MAC) address of the user device. Furthermore, the user identifier may be associated with the identifier of a user device. Such associations between a user identifier and an identifier of a user device may be used in various applications. For example, a one-time password (OTP) for a user to operate an application may be sent from the system operating the application to a user device, e.g., a phone, associated with the user's phone number. Today OTP has become a common way to authenticate or recover an account for a user, which means that a user is represented by a phone number or a user identifier. Attackers have made attempts to perform account take over (ATO) of a user by taking over the phone number of the user. This style of attack is called SIM swapping. SIM swapping, also known as SIM jacking, is a type of ATO attack during which a malicious threat actor uses various techniques (usually social engineering) to transfer a victim's phone number to their own SIM card. SIM swapping attacks have resulted in millions in fraud and losses. It has been difficult for the current technology to protect against such SIM swapping. The telecom network companies may have insufficient validation before switching SIM cards, while the victim and target financial company has no control over the flow of SIM swapping. With the growing number of Internet of Things (IoT) devices, e.g., car, watch, etc., that come with a SIM and are integrated to perform financial transactions independently, protecting against SIM swapping attacks is important to current and future systems.

In a SIM swapping, an attacker changes the association of a user device to a user, causing security information related to the user to be sent to a user device that may not belong to the user. Embodiments herein are relate to providing security protection of association between a user device and a user. Embodiments may verify an identifier of a user device has been activated by a user to replace an existing identifier of the user device associated with a user identifier of the user. In detail, embodiments may track the user's SIM card details and phone number or IoT device via the phone network provider such as AT&T, Verizon, etc. as a service and protect the user against SIM swapping attacks. The moment a SIM card is swapped, and a new SIM is detected via the service provider, a flag is triggered not to allow authentication via phone OTP or IoT OTP to the user device unless verified from other means that the phone (IoT)/SIM change is from a valid user.

FIG. 1 illustrates a computing system 104 to verify an identifier 108 of a user device 101 has been activated by a user 102 to replace an existing identifier of the user device 101 associated with a user identifier 111, in accordance with various embodiments. In embodiments, the user 102 is identified by a service provider 103 using the user identifier 111. For example, a phone company identifies the user 102 using the user identifier 111, which is a phone number.

In embodiments, the user device 101 is to communicate to the service provider 103, and the computing system 104. The user device 101 includes the identifier 108 of the user device 101, and an application software 106 operating on the user device 101. The computing system 104 includes one or more processors, e.g., a processor 105, a storage device 110 coupled to the one or more processors, an application software 107 to be operated by the one or more processors, and an authentication module 109 to be operated by the one or more processors. The storage device 110 may store the user identifier 111 and a set of rules 113. There may be many other components within the user device 101 or the computing system 104, not shown. For example, there may be more than one processor within the computing system 104.

In embodiments, the identifier 108 of the user device 101 may be a hardware based network identifier of the user device, and may include an identifier for a SIM card, or a MAC address of the user device 101. For example, the identifier 108 may include various information, e.g., International Mobile Subscriber Identity (IMSI) and the authentication key that validates the IMSI, Integrated Circuit Card Identifier (ICCID), SIM card issuer, an identifying number for the user account, or parity digits. The user device 101 may be a wireless phone, a cellular phone, a satellite phone, a VoIP phone, a smart phone, a laptop, a tablet, a personal computer, a point of sale (POS) terminal, a transaction terminal, an IoT device, or a handheld computer. The service provider 103 may be a phone service provider, e.g., AT&T® or Verizon®, or an internet service provider. The user identifier 111 is to identify the user 102 by the service provider 103, and may be a phone number or an email address. The computing system 104 may be a computing system for an ecommerce merchant or a financial organization, and may include one or more independent computing devices coupled together. The application software 106 on the user device 101 and the application software 107 on the computing system 104 may be a pair of network software working together to accomplish the desired functions. For example, the application software 106 may be a client side software of an application, e.g., Visa® Checkout®, PayPal®, and the application software 107 may be a serve side software of the same application.

In embodiments, the identifier 108 of the user device 101 may be activated for the user 102 by the service provider 103 through a communication path 121 and a network 131. The identifier 108 may be activated by the user 102, or by an attacker to pretend to be the user 102. If the identifier 108 is activated by an attacker to pretend to be the user 102, and the identifier 108 is a SIM card, a SIM swapping may have happened. However, the service provider 103 may not be able to detect such a SIM swapping using current technology. The service provider 103 may notify the computing system 104 that the identifier 108 of the user device 101 has been activated for the user identifier 111 to replace an existing identifier of the user device associated with the user identifier 111. In some embodiments, the user device 101 may be the same device as the existing user device associated with the user identifier 111, but the identifier 108 is changed. In some other embodiments, both the identifier 108 and the user device 101 may be changed compared to previous device and identifier associated with the user identifier 111. The notification from the service provider 103 may only include a status change for the identifier 108 to be associated with the user identifier 111. The notification from the service provider 103 may not contain the details or the complete information of the identifier 108.

In embodiments, the computing system 104, e.g., the processor 105, is configured to receive from the service provider 103 a notification that the identifier 108 of the user device 101 has been activated in the user device 101 to be associated with the user identifier 111 to replace an existing identifier of the user device 101 associated with the user identifier 111. The notification may be received by the processor 105 through a communication path 123 and a network 133 between the service provider 103 and the computing system 104. The storage device 110 may be configured to store the user identifier 111 of the user 102 to indicate that the existing identifier of the user device associated with the user identifier 111 has been changed. Alternatively, there can be a common ledger or a common database (single source of truth) where multiple service providers contribute to a chained ledger (similar to block chain but users are not anonymous) of phone number to sim card mappings over time. The read/write API keys are provided only to service providers so only they can update phone-sim information. Companies that require this information can automatically read from this ledger or database with API keys of they own. The shared ledger or database provides an efficient proof based system to track sim cards to phone numbers. The shared ledger or database also provides a global log for cybercrime investigations and does not allow conflicts in phone-sim mapping as there can only be one-one phone-sim mapping at any point in time.

In embodiments, the application software 106 is to be operated on the user device 101 by the user 102 or an attacker. A request for information associated with the user identifier 111 may be sent from the user device 101, e.g., through the application software 106, to request the information to be sent to the user device 101. The requested information associated with the user identifier 111 may be for operating the application software by the user 102, e.g., a OTP to login to the application software 106. The request for information associated with the user identifier 111 may be sent through a communication path 125 and a network 135 between the user device 101 and the computing system 104. In some embodiments, the communication path 125 may be different from the communication path 123. In some embodiments, the request for information associated with the user identifier 111 to be sent to the user device 101 may be a request for OTP for the user 102.

In embodiments, the computing system 104 receives from the user device 101 through the communication path 125 between the user device 101 and the computing system 104, the request for information associated with the user identifier 111 to be sent to the user device 101 associated with the identifier 108. The request for information associated with the user identifier 111 may be received by the application software 107 operated by the processor 105. The information associated with the user identifier 111 may be for operating the application software 107 or the application software 106 by the user 102.

In embodiments, the authentication module 109 may be operated by the one or more processors, e.g., the processor 105, to perform various operations for security protection of association between the user device 101 and the user 102 or the user identifier 111. In detail, before sending the requested information associated with the user identifier 111 to the user device 101 associated with the identifier 108, the authentication module 109 is to search the storage device 110 to look up the user identifier 111 to determine whether an existing identifier of the user device 101 associated with the user identifier 111 has been changed. By performing the search to determine any change of an existing identifier of the user device 101 associated with the user identifier 111 has happened, the authentication module 109 can stop sending any information associated with the user identifier 111 to the user device 101 associated with the identifier 108, hence preventing SIM swapping if the identifier 108 is activated by an attacker. Accordingly, the authentication module 109 performs functions not normally performed by the computing system 104, and improves the functionality of a conventional computing system for operating the application software 107.

In embodiments, when the user identifier 111 is found in the storage device 110, the authentication module 109 may perform an additional authentication of the user 102 to verify the identifier 108 of the user device 101 has been activated by the user 102. The additional authentication of the user 102 may be performed through a communication path 127 and a network 137 between the user 102 and the computing system 104. After verifying the identifier 108 of the user device 101 has been activated by the user 102 is successful, the authentication module 109 or the application software 107 may send to the user device 101 through the communication path 125, the requested information associated with the user identifier 111.

In embodiments, the authentication module 109 may perform an additional authentication of the user 102 by various operations. In detail, the authentication module 109 may send to the user 102 through the communication path 127 a request for authentication information different from the user identifier 111 of the user 101. The communication path 127 is a communication path between the computing system 104 and the user 102, which may be different from the communication path 125 between the user device 101 and the computing system 104. For example, the communication path 127 may include a computing device accessible to the user 102, but different from the user device 101. In some other embodiments, the communication path 127 may include the same user device 101, but through a software application operated on the user device 101 but different from the application software 106. Furthermore, in some embodiments, the communication path 127 may include additional steps to be operated by the application software 106 or the application software 107.

In this way, the authentication module 109 may detect the change of the identifier 108 of the user device 101 is performed or authorized by the user 102 or not. An attacker may use a fake identifier 108 of the user device 101, but may be difficult to have access to a different communication path directly to the user 102. The authentication information requested from the user 102 may include information the user 102 knows, information the user 102 has, information about what the user 102 is, information about where the user 102 is, or information about what the user 102 does.

In embodiments, the use of three communication paths, the communication path 123 between the service provider 103 and the computing system 104, the communication path 125 between the user device 101 and the computing system 104, and the communication path 127 between the user 102 and the computing system 104, are a specific implementation on a particular machine architecture to integrate the security protection of association between the user device 101 and the user 102 or the user identifier 111. Furthermore, the use of three communication paths, the communication path 123, the communication path 125, and the communication path 127, represents a specific features that are not available in the current systems to prevent SIM swapping. For example, the use of the communication path 127 between the user 102 and the computing system 104 can effectively verify whether the identifier 108 of the user device 101 has been activated by the user 102 or by an attacker, while a conventional computing system cannot perform such a detection.

The authentication module 109 him may receive a response message from the user 102 to the request for authentication information, and further authenticate the user 102 based on the response message and the set of rules 113. The set of rules 113 for authenticating the user 102 may include a rule about a limit on a number of requests for information associated with the user identifier to be sent to the user device associated with the identifier of the user device, a rule about a limit on a number of identifiers of user devices associated with the user identifier, a rule about a limit on a number of user identifiers associated with the identifier of the user device, a rule about a restriction on providers of the user devices, or a rule providing an authentication scheme corresponding to the identifier of the user device. After the authentication of the user 102 is successful, the authentication module 109 may update the storage 110 to associate the identifier 108 of the user device 101 with the user identifier 111 for the user 102, where the association of the identifier 108 of the user device 101 with the user identifier 111 may be saved as an item 112 to mark the user identifier 111 as verified. The generation of the item 112 to mark the user identifier 111 as verified effect a transformation of a particular article, e.g., the storage device 110 or the user identifier 111 to a different state, e.g., a verified state.

Figure 2:
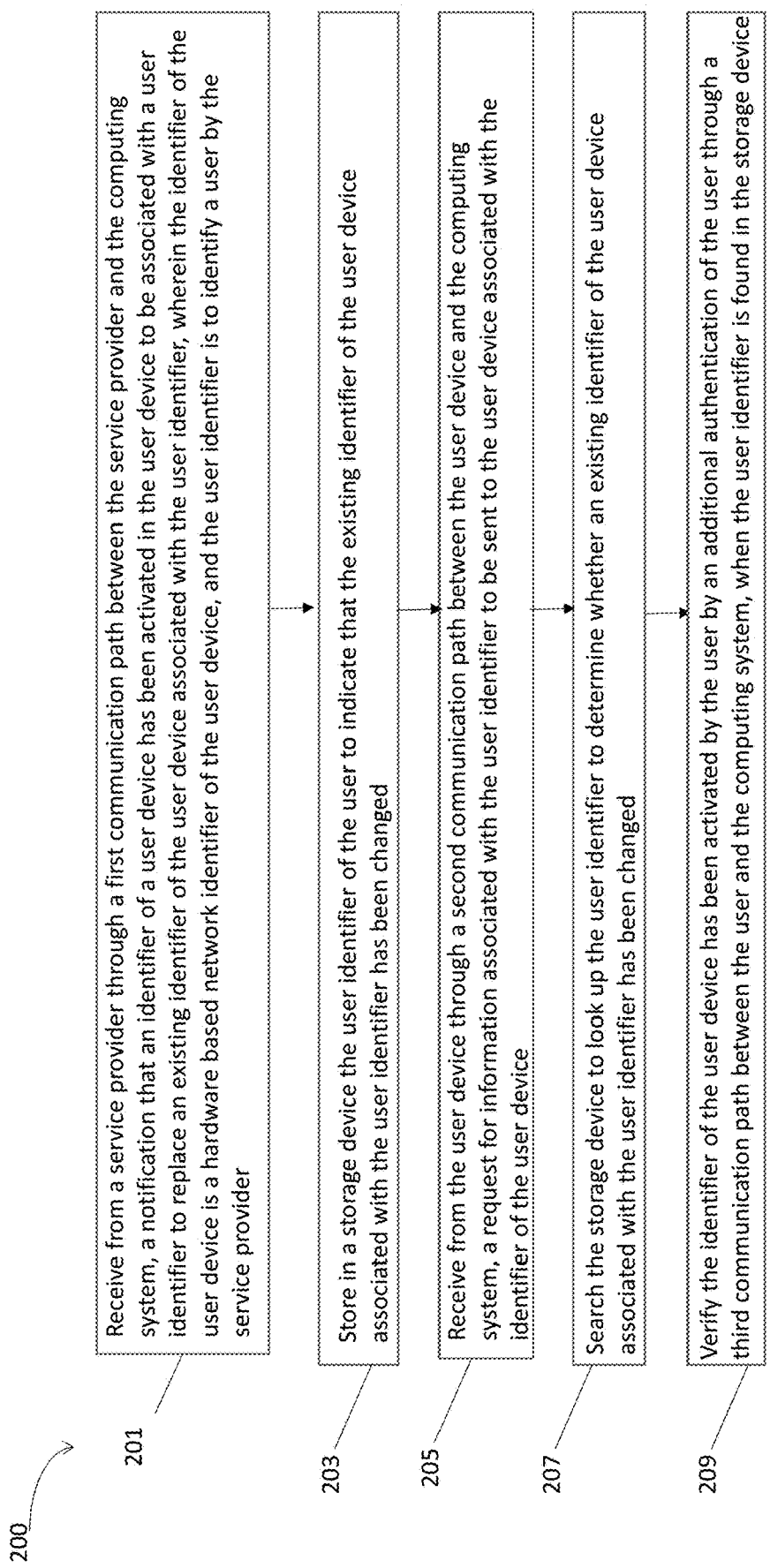
FIG. 2 illustrates an example process for verifying an identifier of a user device has been activated by a user to replace an existing identifier of the user device associated with a user identifier, in accordance with various embodiments.

FIG. 2 illustrates an example process 200 for verifying an identifier of a user device has been activated by a user to replace an existing identifier of the user device associated with a user identifier, in accordance with various embodiments. The process 200 may be performed by the computing system 104 as shown in FIG. 1.

In embodiments, at an interaction 201, the computing system 104 or the processor 105 within the computing system 104 is to receive from a service provider a notification that an identifier of a user device has been activated in the user device to be associated with a user identifier to replace an existing identifier of the user device associated with the user identifier. The notification is received through a first communication path between the service provider and the computing system. The identifier of the user device is a hardware based network identifier of the user device, and the user identifier is to identify a user by the service provider. For example, the computing system 104 or the processor 105 is to receive from the service provider 103 a notification that the identifier 108 of the user device 101 has been activated in the user device 101 to be associated with the user identifier 111 to replace an existing identifier of the user device 101 associated with the user identifier 111. The notification is received through the communication path 123 between the service provider 103 and the computing system 104.

In embodiments, at an interaction 203, the computing system 104 or the processor 105 within the computing system 104 is to store, in a storage device, the user identifier of the user to indicate that the existing identifier of the user device associated with the user identifier has been changed. For example, the computing system 104 or the processor 105 is to store in the storage device 110 the user identifier 111 of the user 102 to indicate that the existing identifier of the user device 101 associated with the user identifier 111 has been changed.

In embodiments, at an interaction 205, the computing system 104 or the processor 105 within the computing system 104 is to receive from the user device a request for information associated with the user identifier to be sent to the user device associated with the identifier of the user device. The request is received through a second communication path between the user device and the computing system. For example, the computing system 104 or the processor 105 is to receive from the user device 101 a request for information associated with the user identifier 111 to be sent to the user device 101 associated with the identifier 108. The request is received through the communication path 125 between the user device 101 and the computing system 104.

In embodiments, at an interaction 207, the computing system 104 or the processor 105 within the computing system 104 is to search the storage device to look up the user identifier to determine whether an existing identifier of the user device associated with the user identifier has been changed. For example, computing system 104 or the processor 105 within the computing system 104 is to search the storage device 110 to look up the user identifier 111 to check whether an existing identifier of the user device 101 associated with the user identifier 111 has been changed.

In embodiments, at an interaction 209, the computing system 104 or the processor 105 within the computing system 104 is to verify the identifier of the user device has been activated by the user by an additional authentication of the user, when the user identifier is found in the storage device. The computing system 104 or the processor 105 is to verify the identifier of the user device has been activated by the user through a third communication path between the user and the computing system. For example, computing system 104 or the processor 105 is to verify the identifier 108 of the user device 101 has been activated by the user 102 by an additional authentication of the user 102, when the user identifier 111 is found in the storage device. The computing system 104 or the processor 105 is to verify the identifier 108 of the user device 101 has been activated through the communication path 127 between the user 102 and the computing system 104.

Figure 3:
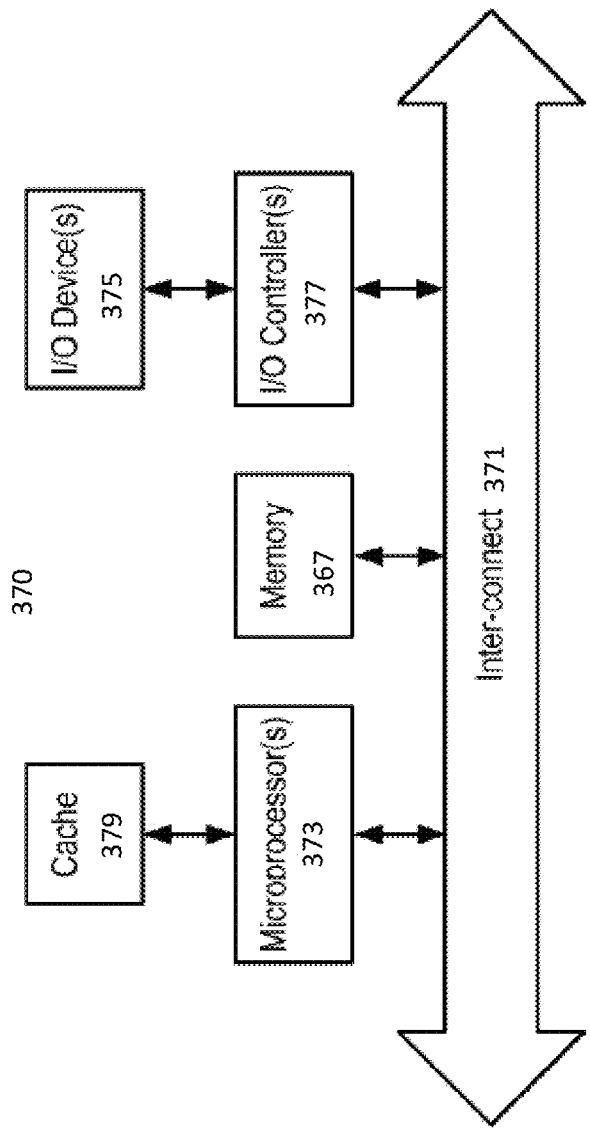
FIG. 3 illustrates an example device suitable for use to practice various aspects of the present disclosure, in accordance with various embodiments.

FIG. 3 illustrates an example device suitable for use to practice various aspects of the present disclosure, in accordance with various embodiments. While FIG. 3 illustrates various components of a computer system, it is not intended to represent any particular architecture or manner of interconnecting the components. One embodiment may use other systems that have fewer or more components than those shown in FIG. 3.

In FIG. 3, the data processing system 370 includes an inter-connect 371, e.g., bus and system core logic, which interconnects a microprocessor(s) 373, memory 367, and input/output (I/O) device(s) 375 via I/O controller(s) 377. The microprocessor 373 is coupled to cache memory 379. I/O devices 375 may include a display device and/or peripheral devices, such as mice, keyboards, modems, network interfaces, printers, scanners, video cameras and other devices known in the art. In one embodiment, when the data processing system is a server system, some of the I/O devices 375, such as printers, scanners, mice, and/or keyboards, are optional.

In one embodiment, the inter-connect 371 includes one or more buses connected to one another through various bridges, controllers and/or adapters. In one embodiment, the I/O controllers 377 include a USB (Universal Serial Bus) adapter for controlling USB peripherals, and/or an IEEE-1394 bus adapter for controlling IEEE-1394 peripherals.

In one embodiment, the memory 367 includes one or more of: ROM (Read Only Memory), volatile RAM (Random Access Memory), and non-volatile memory, such as hard drive, flash memory, etc. Volatile RAM is typically implemented as dynamic RAM (DRAM), which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory. The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In this description, some functions and operations are described as being performed by or caused by software code to simplify description. That is, the techniques may be carried out in a computer system or other data processing system in response to its processor, such as a microprocessor, executing sequences of instructions contained in a memory, such as ROM, volatile RAM, non-volatile memory, cache or a remote storage device.

Alternatively, or in combination, the functions and operations as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

In embodiments, a storage medium may store instructions for practicing methods described with references to FIGS. 1-2, in accordance with various embodiments. For example, a non-transitory computer-readable storage medium may include a number of programming instructions. Programming instructions may be configured to enable a device, e.g., the device 370, in response to execution of the programming instructions, to perform, e.g., various operations associated with performing security protection of association between the user device 101 and the user 102, verifying the identifier 108 of the user device 101 has been activated by the user 102 to replace an existing identifier of the user device 101 associated with the user identifier 111, operations described in the process 200, or other operations described herein.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

The non-transitory computer-readable storage medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

The description and drawings are illustrative and are not to be construed as limiting. The present disclosure is illustrative of disclosed features to enable a person skilled in the art to make and use the techniques. Various features, as described herein, should be used in compliance with all current and future rules, laws and regulations related to privacy, security, permission, consent, authorization, and others. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

We claim:

1. A computer-implemented method for to perform security protection of association between a user device and a user, comprising:
    receiving, by a processor of a computing system, from a service provider through a first communication path between the service provider and the computing system, a notification that an identifier of a user device has been activated in the user device to be associated with a user identifier and to replace an existing identifier of the user device associated with the user identifier, wherein the identifier of the user device is a hardware based network identifier including a subscriber identity module (SIM) card or a media access control (MAC) address of the user device, and the user identifier includes a phone number or an email address to identify a user to the service provider, wherein the notification is sent to the computing system to determine whether an attacker is attempting to gain control over the user identifier by transferring the user identifier to another user device under control of the attacker to cause security information related to the user to be sent to that other user device, wherein user authentication via a phone or IoT one-time password (OTP) is not allowed until the user is authenticated as a valid user;
    storing, in a storage device coupled to the processor, the user identifier of the user to indicate that the existing identifier of the user device associated with the user identifier has been changed;
    receiving, by the processor, from the user device through a second communication path between the user device and the computing system, a request for information associated with the user identifier to be sent to the user device associated with the identifier of the user device;
    searching the storage device to look up the user identifier; and
    verifying the identifier of the user device has been activated by the user by an additional authentication of the user through a third communication path between the user and the computing system, when the user identifier is found in the storage device, wherein the user authentication via the third communication path protects against an attacker from attempting to use the user device from performing an account take over (ATO) of that user.

2. The computer-implemented method of claim 1, wherein verifying the identifier of the user device has been activated by the user by the additional authentication of the user includes:
    sending, to the user through the third communication path between the user and the computing system, a request for authentication information different from the user identifier of the user;
    receiving, from the user, a response message to the request for authentication information; and
    authenticating the user based on the response message and a set of rules.

3. The computer-implemented method of claim 1, further comprising:
    sending, to the user device associated with the identifier of the user device through the second communication path, after verifying the identifier of the user device has been activated by the user is successful, the requested information associated with the user identifier.

4. The computer-implemented method of claim 1, further comprising:
    updating the storage to associate the identifier of the user device with the user identifier.

5. The computer-implemented method of claim 1, wherein the request for information associated with the user identifier to be sent to the user device includes a request for one time password (OTP) for the user.

6. The computer-implemented method of claim 1, wherein the request for information associated with the user identifier to be sent to the user device is received through an application software operating on the user device, and the information associated with the user identifier is for operating the application software by the user.

7. The computer-implemented method of claim 1, wherein the user device includes a wireless phone, a cellular phone, a satellite phone, a VoIP phone, a smart phone, a laptop, a tablet, a personal computer, a point of sale (POS) terminal, a transaction terminal, or a handheld computer.

8. The computer-implemented method of claim 1, wherein the service provider includes a phone service provider or an internet service provider.

9. The computer-implemented method of claim 2, wherein sending to the user the request for authentication information different from the user identifier of the user includes sending the request to the user through the third communication path that is different from the second communication path.

10. The computer-implemented method of claim 2, wherein the authentication information includes information the user knows, information the user has, information about what the user is, information about where the user is, or information about what the user does.

11. The computer-implemented method of claim 2, wherein the set of rules for authenticating the user based on the response message includes a rule about a limit on a number of requests for information associated with the user identifier to be sent to the user device associated with the identifier of the user device, a rule about a limit on a number of identifiers of user devices associated with the user identifier, a rule about a limit on a number of user identifiers associated with the identifier of the user device, a rule about a restriction on providers of the user devices, or a rule providing an authentication scheme corresponding to the identifier of the user device.

12. A computing system to perform security protection of association between a user device and a user, comprising:
  one or more processors configured to receive from a service provider through a first communication path between the service provider and the computing system, a notification that an identifier of the user device has been activated in the user device to be associated with a user identifier and to replace an existing identifier of the user device associated with the user identifier, wherein the identifier of the user device is a hardware based network identifier including a subscriber identity module (SIM) card or a media access control (MAC) address of the user device, and the user identifier includes a phone number or an email address to identify the user to the service provider, wherein the notification is sent to the computing system to determine whether an attacker is attempting to gain control over the user identifier by transferring the user identifier to another user device under control of the attacker to cause security information related to the user to be sent to that other user device, wherein user authentication via a phone or IoT one-time password (OTP) is not allowed until the user is authenticated as a valid user;
  a storage device coupled to the one or more processors, wherein the storage device is configured to store the user identifier of the user to indicate that the existing identifier of the user device associated with the user identifier has been changed;
  an application software to be operated by the one or more processors, wherein the application software is to receive from the user device through a second communication path between the user device and the computing system, a request for information associated with the user identifier to be sent to the user device associated with the identifier of the user device, and the information associated with the user identifier is for operating the application software by the user; and
  an authentication module to be operated by the one or more processors, wherein the authentication module is to:
    search the storage device to look up the user identifier;
    send, to the user through a third communication path between the user and the computing system, when the user identifier is found in the storage device, a request for authentication information different from the user identifier of the user;
    receive, from the user, a response message to the request for authentication information; and
    authenticate the user based on the response message and a set of rules, wherein the user authentication via the third communication path protects against an attacker from attempting to use the user device from performing an account take over (ATO) of that user.

13. The computing system of claim 12, wherein the application software is further to send, to the user device associated with the identifier of the user device through the second communication path, after authenticating the user based on the response message is successful, the requested information associated with the user identifier.

14. The computing system of claim 12, wherein the authentication module is further to update the storage to associate the identifier of the user device with the user identifier.

15. The computing system of claim 12, wherein the third communication path is different from the second communication path.

16. The computing system of claim 12, wherein the request for information associated with the user identifier to be sent to the user device includes a request for one time password (OTP) for the user.

17. An executable software product stored on a non-transitory computer-readable medium containing program instructions that cause a processor of a computing system to perform security protection of association between a user device and a user, in response to execution of the instructions by the processor, to:
  receive, from a service provider through a first communication path between the service provider and the computing system, a notification that an identifier of a user device has been activated in the user device to be associated with a user identifier and to replace an existing identifier of the user device associated with the user identifier, wherein the identifier of the user device is a hardware based network identifier including a subscriber identity module (SIM) card or a media access control (MAC) address of the user device, and the user identifier includes a phone number or an email address to identify the user to the service provider, wherein the notification is sent to the computing system to determine whether an attacker is attempting to gain control over the user identifier by transferring the user identifier to another user device under control of the attacker to cause security information related to the user to be sent to that other user device, wherein user authentication via a phone or IoT one-time password (OTP) is not allowed until the user is authenticated as a valid user;
  store, in a storage device coupled to the processor, the user identifier of the user to indicate that the existing identifier of the user device associated with the user identifier has been changed;
  receive, by the processor, from the user device through a second communication path between the user device and the computing system, a request for information associated with the user identifier to be sent to the user device associated with the identifier of the user device;
  search the storage device to look up the user identifier;
  send, to the user through a third communication path between the user and the computing system, when the user identifier is found in the storage device, a request for authentication information different from the user identifier of the user;

receive, from the user, a response message to the request for authentication information; and authenticate the user based on the response message and a set of rules, wherein the user authentication via the third communication path protects against an attacker from attempting to use the user device from performing an account take over (ATO) of that user.

18. The executable software product of claim 17, wherein the program instructions further cause the processor to:

send, to the user device associated with the identifier of the user device through the second communication path, after authenticating the user based on the response message is successful, the requested information associated with the user identifier; and update the storage to associate the identifier of the user device with the user identifier.

19. The executable software product of claim 17, wherein the third communication path is different from the second communication path, and the request for information associated with the user identifier to be sent to the user device includes a request for one time password (OTP) for the user.

\* \* \* \* \*